US 6,691,728 B2

United States Patent
Beals et al.

(10) Patent No.: US 6,691,728 B2
(45) Date of Patent: Feb. 17, 2004

(54) METHODS AND SYSTEMS FOR INSTALLING A PIPELINE WITHIN A PIPELINE

(75) Inventors: Scott A. Beals, Los Angeles, CA (US); Ronald D. Hammer, Los Angeles, CA (US); Robert E. Evans, Pasadena, CA (US); Kevin Leeds, Los Angeles, CA (US)

(73) Assignee: Sempra Fiber Links, San Diego, CA (US)

( * ) Notice: Subject to any disclaimer, the term of this patent is extended or adjusted under 35 U.S.C. 154(b) by 0 days.

(21) Appl. No.: 10/159,298

(22) Filed: May 29, 2002

(65) Prior Publication Data

US 2002/0189672 A1 Dec. 19, 2002

Related U.S. Application Data

(63) Continuation of application No. 09/973,961, filed on Oct. 9, 2001, which is a continuation-in-part of application No. 09/876,802, filed on Jun. 7, 2001, which is a continuation-in-part of application No. 09/685,236, filed on Oct. 10, 2000, now Pat. No. 6,536,463.

(51) Int. Cl.⁷ ............................. H02G 1/08; H02G 9/06; F16L 1/028; F16L 41/04

(52) U.S. Cl. ............. 137/15.12; 137/317; 254/134.3 R; 254/134 FT; 254/134.4; 385/100; 405/154.1; 405/183.5; 405/184

(58) Field of Search ............................. 137/15.12, 15.13, 137/15.14, 317, 318; 138/97, 155; 254/134.3 R, 134.3 FT, 134.4; 405/154.1, 155, 156, 157, 158, 159, 168.3, 174, 177, 183.5, 184; 385/100

(56) References Cited

U.S. PATENT DOCUMENTS

| 920,455 A | 5/1909 | Greenan |
| 1,658,887 A | 2/1928 | Dotzauer |
| 2,930,584 A | 3/1960 | Hensley et al. |

(List continued on next page.)

FOREIGN PATENT DOCUMENTS

| DE | 23 55 383 A1 | 5/1975 |
| DE | 3140928 A1 | 5/1983 |
| EP | 108 590 | 5/1984 |
| EP | 0978715 B1 | 2/2000 |
| EP | 795 942 B1 | 8/2000 |

OTHER PUBLICATIONS

RM Consulting, Final Report "Fiber Optic Cable In Live Natural Gas Lines", Phase 11A, Nov. 29, 1999, 3 pages.
Gregor, Paul E et al., Alcatel—Optical Fiber Cable Links With Gas Pipelines As An Alternative Telecommunications Route Technology, International Wire Cable Symposium Proceedings 1999, 7 pages.

(List continued on next page.)

*Primary Examiner*—George L. Walton
(74) *Attorney, Agent, or Firm*—Perkins Coie LLP

(57) ABSTRACT

A method of routing a new pipe duct into an existing pressurized gas pipeline includes the step of introducing a translating member into the pressurized gas pipeline via an entry port in a first fitting attached to the pressurized gas pipeline. The translating member, such as a duct rod, is advanced within the pressurized gas pipeline by a driving mechanism, until it reaches second fitting. The translating member is attached to a pipe inner duct. The duct rod and pipe inner duct are then pulled back through the pressurized gas pipeline by the driving mechanism.

10 Claims, 13 Drawing Sheets

U.S. PATENT DOCUMENTS

| | | | |
|---|---|---|---|
| 3,034,766 | A | 5/1962 | Hamrick |
| 4,090,534 | A | 5/1978 | Martin et al. |
| 4,169,486 | A | 10/1979 | Otteman |
| 4,232,981 | A | 11/1980 | Lee |
| 4,261,204 | A | 4/1981 | Donaldson |
| 4,427,112 | A | 1/1984 | Di Giovanni et al. |
| 4,518,817 | A | 5/1985 | Kirby et al. |
| 4,649,948 | A | 3/1987 | Hudson |
| 4,756,510 | A | 7/1988 | Klamm et al. |
| 4,856,937 | A | 8/1989 | Grocott et al. |
| 4,869,301 | A | 9/1989 | Ohmi et al. |
| 4,892,442 | A | 1/1990 | Shoffner |
| 4,917,539 | A | 4/1990 | De la Salle |
| 5,042,528 | A | 8/1991 | England et al. |
| 5,090,665 | A | 2/1992 | Walters et al. |
| 5,121,644 | A | 6/1992 | Grey et al. |
| 5,137,047 | A | 8/1992 | George |
| 5,143,353 | A | 9/1992 | Sano et al. |
| 5,156,376 | A | 10/1992 | Spicer |
| 5,205,542 | A | 4/1993 | Keeble |
| 5,227,080 | A | 7/1993 | Berry |
| 5,360,291 | A | 11/1994 | Shimizu |
| 5,482,073 | A | 1/1996 | Winnie et al. |
| 5,612,499 | A | 3/1997 | Andrew et al. |
| 5,651,639 | A | 7/1997 | Wentworth |
| 5,660,202 | A | 8/1997 | Rush, Jr. et al. |
| 5,749,389 | A | 5/1998 | Ritrosi et al. |
| 5,778,919 | A | 7/1998 | Petrone |
| 5,807,026 | A | 9/1998 | Valette |
| 5,884,384 | A | 3/1999 | Griffioen |
| 5,934,304 | A | 8/1999 | Peterson et al. |
| 5,971,035 | A | 10/1999 | Griffioen |
| 6,019,351 | A | 2/2000 | Allen |
| 6,056,004 | A | 5/2000 | Agnew |
| 6,130,975 | A | 10/2000 | Eyres |
| 6,286,542 | B1 | 9/2001 | Morain et al. |
| 6,301,414 | B1 | 10/2001 | Liese et al. |
| 6,341,188 | B1 | 1/2002 | Serrander et al. |
| 2002/0114595 | A1 | 8/2002 | Potash |
| 2003/0068143 | A1 | 4/2003 | Martinez et al. |

OTHER PUBLICATIONS van Heugten, Wim H.H., "Gastec Glass–in–gas method leads to considerable reduction in laying costs", Gastec NV, 4 pages.

Reuters, Telecom stocks are exciting high growth investment opportunities. Mar. 1, 2000, 1 page.

Scott, Latayne C., Nortel Targeting Utilites' Telecom Business, Apr. 21 2000, 3 pages.

Gastec, "Glass fiber Optic Cables in Gas Pipes", Gastec 2000, 30 pages.

FIG. 4A
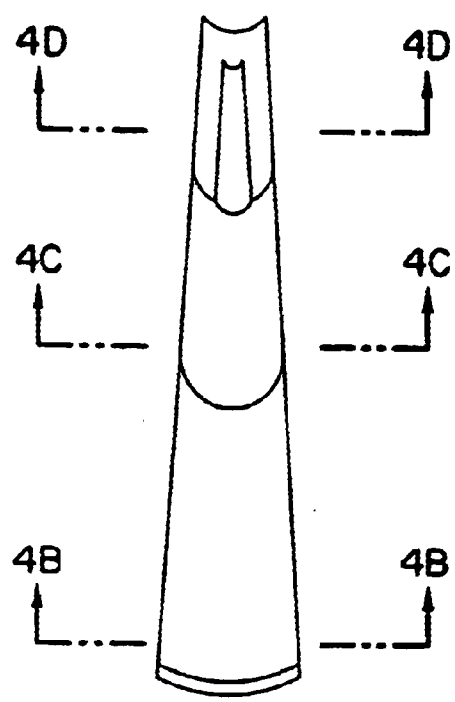
FIG. 4D
FIG. 4C
FIG. 4B

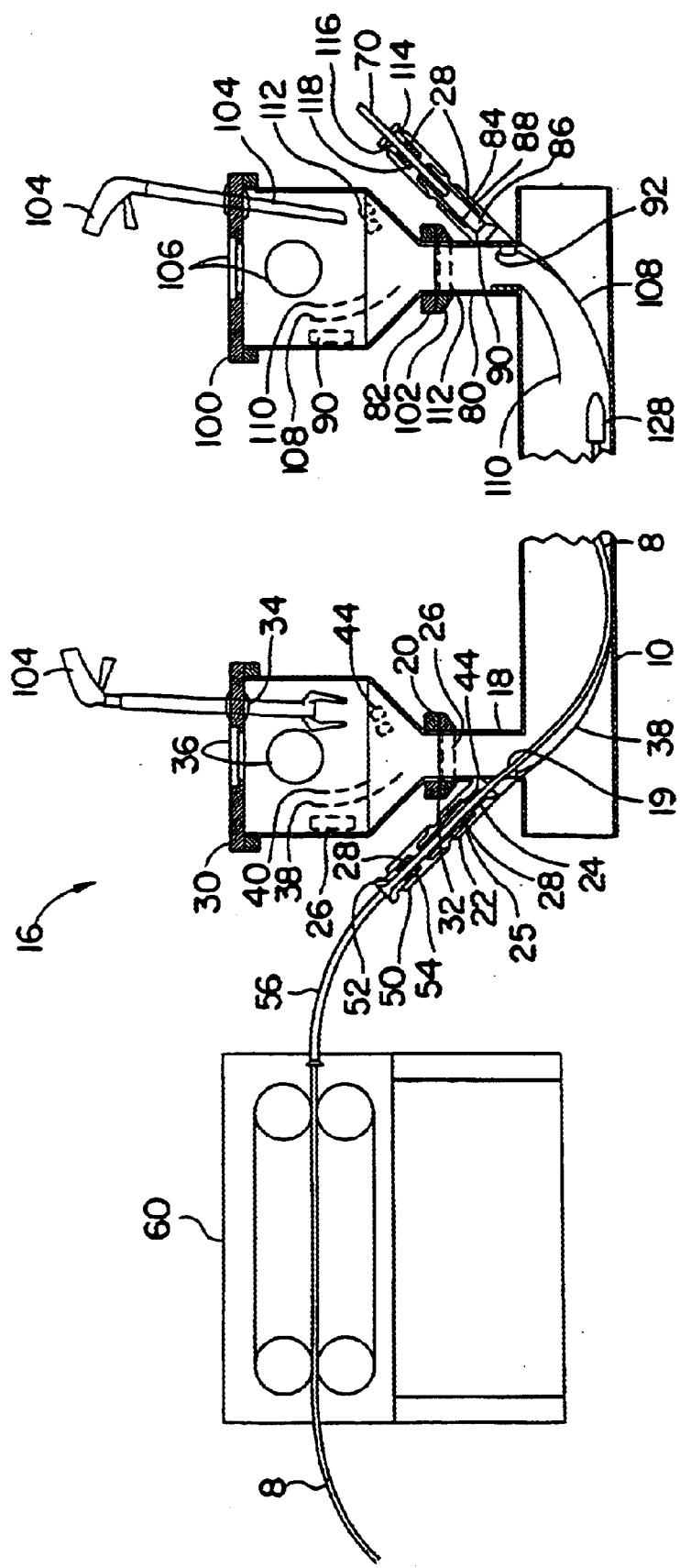

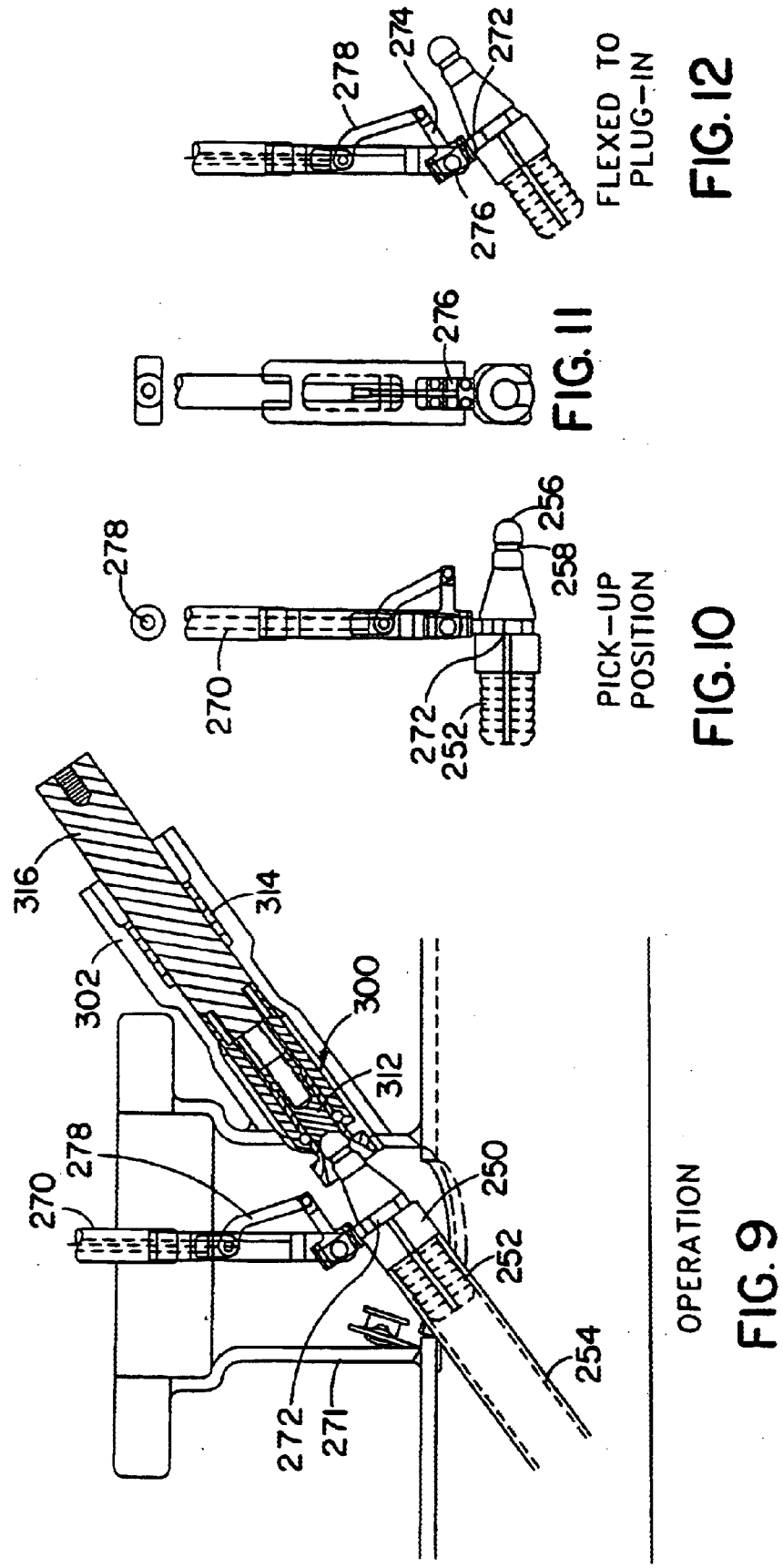

METHODS AND SYSTEMS FOR INSTALLING A PIPELINE WITHIN A PIPELINE

This Application is a Continuation of U.S. patent application Ser. No. 09/973,961, filed Oct. 9, 2001, and now pending, which is a Continuation-in-Part of U.S. patent application Ser. No. 09/876,802, filed Jun. 7, 2001, and now pending, which is a Continuation-in-Part of U.S. patent application Ser. No. 09/685,236, filed Oct. 10, 2000, now U.S. Pat. No. 6,536,463. These applications incorporated herein by reference. U.S. patent application Ser. No. 10/158,414, filed May 29, 2002, is also incorporated herein by reference.

BACKGROUND OF THE INVENTION

The field of the invention is systems and methods for installing fiber optic cable or similar cables or conduits underground, and upgrading existing gas pipelines via installation of a new inner pipeline within the existing pipeline. More specifically, the invention relates to the installation of such cable or conduit or inner pipeline into pressurized pipelines, such as natural gas pipelines.

Natural gas utilities are constantly replacing and upgrading their distribution pipeline systems. These efforts are undertaken for a variety of reasons, including situations when the pipe's useful life is reached, when demand requires that additional supplies be distributed or when improved pipeline materials become available. In many cases, a lower pressure pipeline system can be upgraded to a higher-pressure system by installation of higher pressure-rated or newer pipe with a substantially smaller diameter.

In urban areas, replacement or upgrade of distribution systems is especially problematic since open trenching costs are very high and public disruption significant. Alternatives to trenching include various methods for insertion of "casing" into the existing pipelines. This process, while generally more acceptable than trenching, is also costly. Many casing methods require de-pressurization of the pipeline while the casing is being installed. This is costly to the utility and can disrupt service to substantial numbers of customers for extended time periods.

Accordingly, improved methods and systems are needed for replacing and upgrading existing pipeline systems.

BRIEF STATEMENT OF THE INVENTION

In a first aspect of the invention, a method of installing a pipe inner duct into a pressurized pipeline includes the step of attaching a first air or pressure lock housing to the pressurized pipeline at a first location. A second air or pressure lock housing is attached to the pressurized pipeline at a second location. Duct rod or other translating member is preferably fed into the pipeline through a seal at the first location. The duct rod is pushed or routed to the second location.

A pipe inner duct is attached to the duct rod, at or adjacent to the second location, either inside or outside of the pipeline. The duct rod and the pipe inner duct are then pulled back to the first location and routed out of the pipeline.

A second and separate aspect of the invention includes the steps of attaching a first fitting to the pressurized pipeline at a first location. A first valve is attached to the first drilling fitting. A cutting or drilling tool is attached to the valve, and sealed against the valve. The valve is opened. A pipe cutter of the cutting tool is extended through the open valve to cut or drill a hole into the pressurized pipeline through the first fitting. The fitting and pipe cutter are preferably perpendicular to the pipeline to better facilitate the drilling operation. The cutter is withdrawn and the valve is then closed. The cutting tool is preferably removed.

A first air lock housing is installed on the first valve. The valve is opened and the pressure is equalized between the first air lock housing and the pressurized pipeline. A guide ball or similar duct rod end guide is optionally attached onto the end of the duct rod using a first manipulator in the first air lock housing.

A second fitting is attached to the pressurized pipeline at a second location. The exit port of the second drilling fitting is sealed. A second valve is attached to the second fitting. A cutting or drilling tool is attached and sealed against the valve. The valve is opened. A cutter is extended from the cutting tool and a hole is cut or drilled into the pressurized pipeline through the second fitting. The cutter is withdrawn and the valve is closed. A second air lock housing is installed on the second drilling fitting. The second valve is opened and pressure is equalized. A duct rod or other translating member is pushed along inside of the pressurized pipeline to the second fitting. At the second fitting, the guide ball or other rod end guide, if any, is removed from the duct rod, for example using a second manipulator. The duct rod is attached to a pipe inner duct. The duct rod and the pipe inner duct are pulled back through the pipeline. Alternatively, once the duct rod is routed between the first and second air lock housings, the pipe inner duct can be attached to duct rod outside of the first air lock housing and the duct rod can be pulled forward from the second air lock housing, to route the pipe inner duct through the pipeline.

The pipe inner duct then provides a new pipeline within the existing pipeline.

The methods and apparatus allow for the installation of a new inner pipeline within an existing pressurized pipeline, such as a gas pipeline, without requiring any shutoff or interruption in service. In addition, no bypass pipeline is needed to maintain service to customers connected to the pipe section where the new inner pipeline is being installed. The methods are suitable for both metal and plastic pipelines. Excavation or trenching to replace the existing pipeline or to lay a new pipeline, is avoided.

The invention resides as well in sub-combinations of the methods and systems described. The tools and fittings described also constitute separate inventions to be claimed, apart from systems and methods. These items may also be provided as a kit.

It is an object of the invention to provide a method and system for installing a pipe inner duct into existing pressurized (e.g., gas) pipelines without interrupting the flow in the pipeline, to provide a new pipeline within the existing pipeline.

The following brief and detailed descriptions of the drawings refer to installation of cable and conduit. It will be clear with reference to the discussion of FIG. 16 that the description of installation of cable or conduit applies as well to the installation of an inner duct within an existing pipeline.

BRIEF DESCRIPTION OF THE DRAWINGS

FIG. 4A is a front view of a guide trough.

FIGS. 4B, 4C and 4D are section views taken at lines 4B—4B, 4C—4C, and 4D—4D of FIG. 4A.

FIG. 5 is a side view of the installation device according to alternative embodiment of the invention.

In FIGS. 6 and 7, the pipe fitting, valve, and air lock components are the same on the inlet and exit ends, although they are not fully illustrated on the inlet end. For purposes of illustration, the airlock on the inlet end of FIG. 6 is replaced with the pipe drilling or cutting machine, while in FIG. 7, a top view of the drilling fitting and the hot-tap gate valve is shown.

FIG. 9 is a section view of another embodiment for use with conduit.

FIG. 10 is a side view of the manipulator of FIG. 8 in the pick up position.

FIG. 11 is a front view thereof.

FIG. 12 is a side view of the manipulator of FIG. 9 in the plug in position.

DETAILED DESCRIPTION OF THE DRAWINGS

Figure 1:
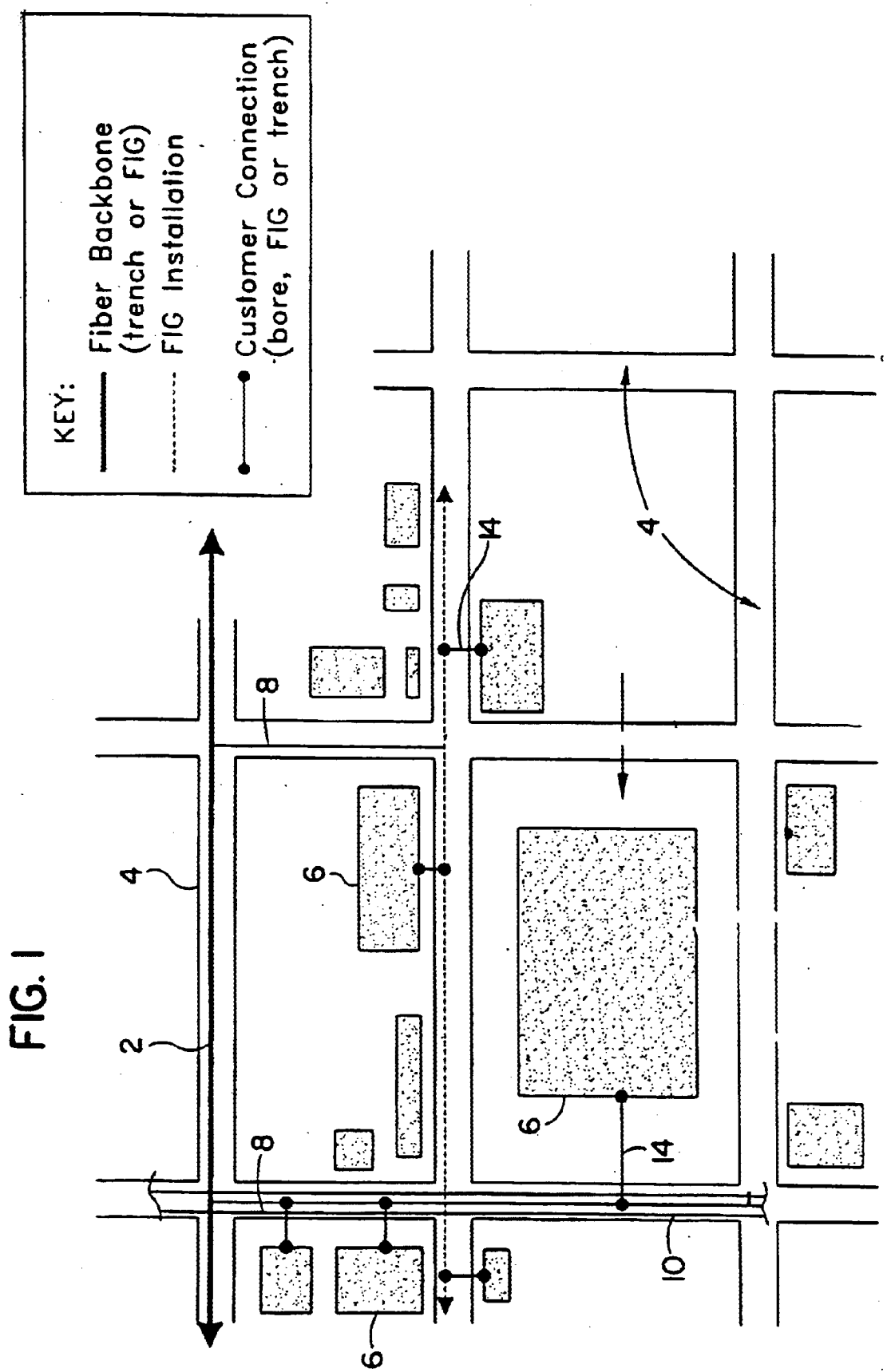
FIG. 1 is a plan view of a geographical area that has installed fiber optic cable or conduit in underground pressurized gas pipelines.

FIG. 1 illustrates a map or plan view of a portion of an urban area such as a city, town, university campus, etc. A main fiber optic backbone 2 runs underneath one or more of the streets 4. Various buildings 6 are dispersed in the vicinity of the main fiber optic backbone 2. These buildings 6 can be individual properties, or alternatively, the buildings 6 can be campuses consisting of multiple properties. Fiber optic conduit 8 that contains one or more bundles of fiber optic cable is shown branching from the main fiber optic backbone 2 under the streets 4. The fiber optic conduit 8 is located in pressurized gas pipelines 10 located underground. The fiber optic conduit 8, or a pipe inner duct, is installed in accordance with the methods and devices described in below.

To get the fiber optic conduit 8 from the pressurized gas pipelines 10 to the buildings 6, individual customer connections 14 are installed to bring the fiber optic cable (contained within fiber optic conduit 8) directly to a customer site. In some instances, such as the larger building 6 shown in the center of FIG. 1, multiple customer connections 14 may be made.

Figure 2:
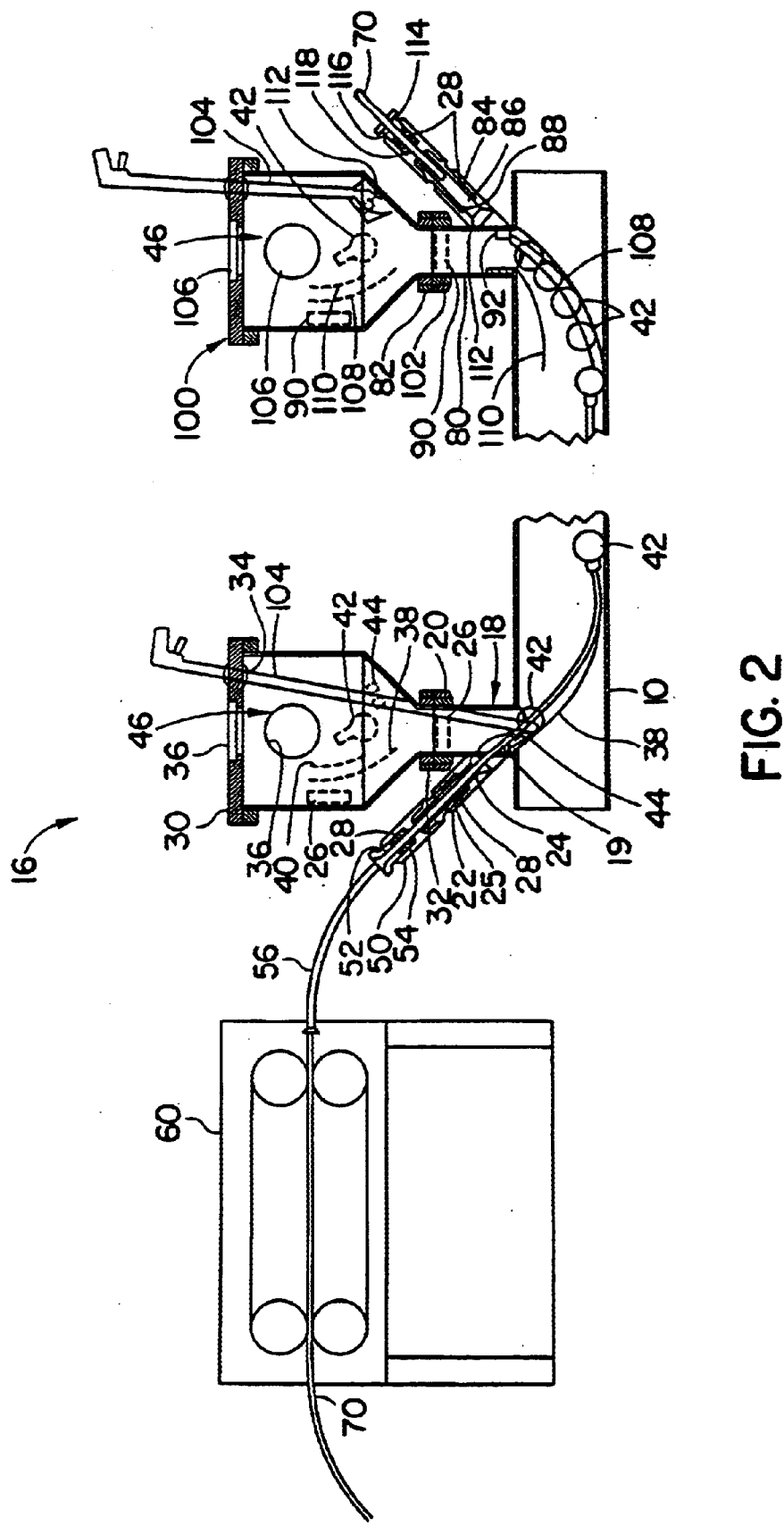
FIG. 2 is a schematic view of the system and methods of the present invention, with an installation device pushing a duct rod and guide ball through a pressurized gas pipeline.
Figure 3:
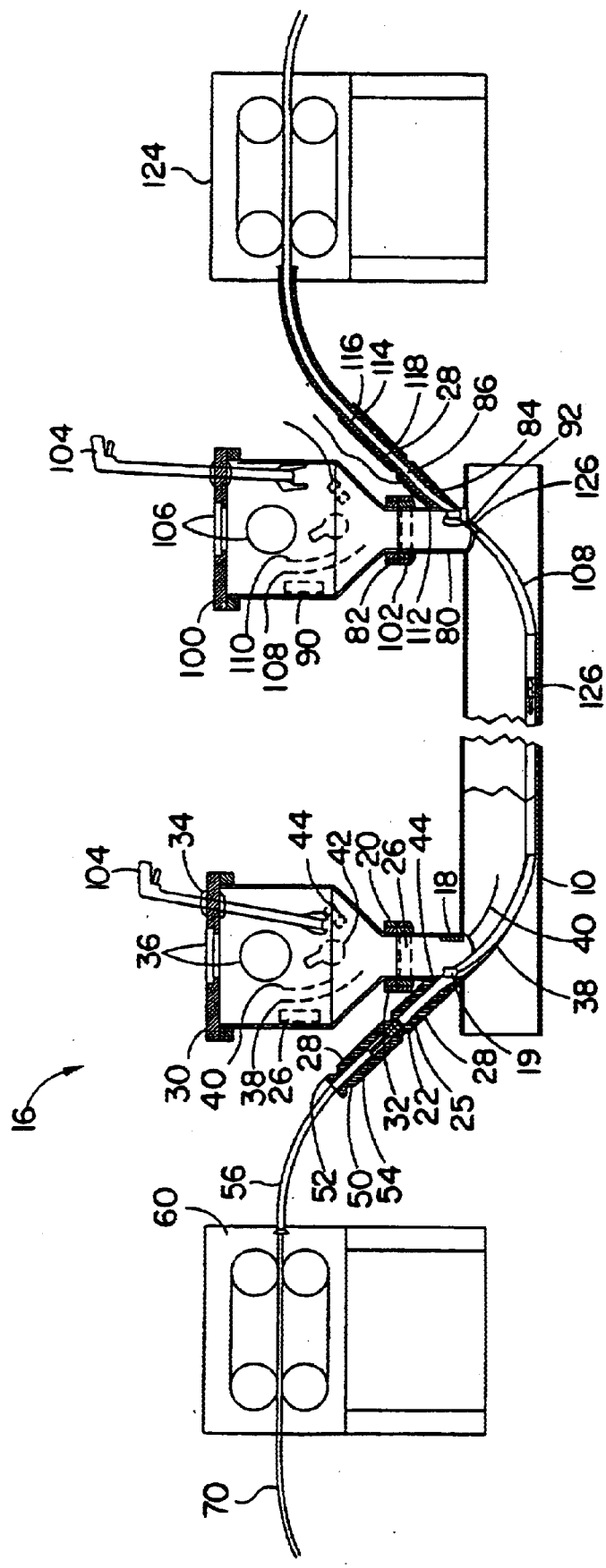
FIG. 3 is a schematic view of the system and methods of the present invention, with an installation device pulling the duct rod and fiber optic conduit back through the pressurized gas pipeline.

Referring now to FIGS. 2 and 3, a system 16 is shown for the installation of fiber optic conduit. A first access or drilling fitting 18 is attached to the exterior of the pressurized gas pipeline 10, typically by welding. The first drilling fitting 18 includes a flange portion 20, and a side arm including an entry gland 22. The side arm is preferably at an angle of 30–40° to the pipeline, to clear holes while maximizing the feeding force in the direction of the pipeline, and to minimize bending of cable. The entry gland 22 and the first drilling fitting 18 connect into the interior or lumen of the pressurized gas pipeline 10. The entry gland 22 can include a bore 24 that at one end receives a split plug seal 44, if needed to temporarily seal the gland while changing fittings or packings. The entry gland 22 also includes a recess 25 for holding a temporary packing material 28 such as TEFLON (resinous fluorine polymers) or a permanent elastomer seal such as VITON (synthetic rubber). A first completion plug 26 is shown in phantom in the first drilling fitting 18. The first completion plug 26 is removable from the first drilling fitting 18 as described below. The angle of the entry/exit port and the side arm is preferably optimized to allow the maximum possible bend radius for the cable or conduit to produce the greatest amount of force in the direction of the pipe when pushing axially on the duct rod or conduit from outside the pipe.

A first pressure or air lock housing 30 is mounted to the flange portion 20 of the first drilling fitting 18, preferably via a flange and bolts 32. The first air lock housing 30 includes a interior portion or space 46 where various components and tools can be hung, placed in receivers or otherwise stored. A first manipulator 34 extends through the first air lock housing 30 into the space 46. Preferably, the first manipulator 34 includes one or more manipulator arms that can be rotated and/or extended at a wide angle from vertical within the first air lock housing 30. The first manipulator 34 is sealed against gas pressure when the first air lock housing 30 is pressurized. The first air lock housing 30 also includes viewing ports 36 in the top and side of the first air lock housing 30. The viewing ports 36 permit an operator to visually observe the interior portion of the first air lock housing 30 and first drilling fitting 18 and the internal portion of the pipeline in the vicinity where the access hole is drilled or cut.

As shown in dotted lines in FIG. 2, inside the first air lock housing 30 is the first completion plug 26, a first guide trough 38, a corner shield 40, a guide ball 42, and tapered split plugs 44. These items are movable or installable within the first air lock housing 30 via the first manipulator 34 and can be used in the installation of the fiber optic cable or conduit 8. The first guide trough 38 and the corner 40 shield are preferably coated with a low friction polymer coating such as TEFLON.

A removable packing gland 50 is engaged to and seals with the entry gland 22. The removable packing gland 50 includes a bore 52 connecting to the bore 24 of the entry gland 22. The removable packing gland 50 also includes a recess 54 for holding packing seal 28 such as TEFLON or VITON. A guide duct 56 is preferably located on an end of the removable packing gland 50 to aid in guiding the duct rod 70 through removable packing gland 50.

Still referring to FIG. 2, a first driving mechanism or rod driver 60 is located relatively near the first drilling fitting 18 and the first air lock housing 30. The first rod driver 60 provides the moving force to push and pull the duct rod 70 through the pressurized gas pipeline 10. Preferably, the first rod driver 60 is a commercial tractor feeder. The first rod driver 60 engages or grips the duct rod 70. The duct rod 70 is preferably made from a glass-reinforced composite polymer that is typically used as a snake for cable pulling. The duct rod 70 advantageously includes a polymer coating such as TEFLON or the like to aid in pushing and pulling through the pressurized gas pipeline 10. The duct rod can be any of those commercially available with a diameter that fits the dimensions of the removable packing gland 50, typically 10–12 mm OD.

Test results show that steel duct rod works well in plastic pipelines, and fiberglass duct rod works well in steel pipelines. However, fiberglass duct rod may not be stiff enough for use over long distances. Steel duct rod coated with a low friction material, such as a polymer, is preferred for use in metal or steel pipelines, especially over long distances. The duct rod may be installed and routed using a tractor feeder, which can push or pull the duct rod. Alternatively, a power rod feeder, which can push, pull, and simultaneously turn or rotate the duct rod, may be used.

FIG. 2 also shows the guide attachment, in this case a ball 42 connected to the end of the duct rod 70. The guide attachment 42 is removably connected to the duct rod 70 during the installation process if it is too large to fit through the entry/exit glands. The guide attachment 42 helps prevent the duct rod 70 from getting stuck in the pressured gas pipeline 10 from such things as burrs, slag, and the like. The guide attachment 42 preferably has an outer diameter small enough to fit through the hole drilled in the pipeline typically about 30–60 mm. The invention can be used with small diameter or larger diameter pipelines. FIG. 2 also shows the first guide trough 38 connected to the first drilling fitting 18. The connection is made via studs 19 or other suitable mans for attaching the trough in a stable manner. The first guide trough 38 is deployed from the first air lock housing 30 and helps in the introduction and removal of the duct rod 70 and fiber optic conduit 8.

Still referring to FIG. 2, a second access or drilling fitting 80 is attached to the exterior of the pressurized gas pipeline 10, typically from about 100 to 500 meters from the first fitting. The second access or drilling fitting 80 includes a flange portion 82 and an exit gland 84. The exit gland 84 in the second drilling fitting 80 connects with the interior of the pressurized gas pipeline 10. The exit gland 84 includes a bore 86 tapered at one end for receiving split plugs 112. The exit gland 84 also includes a recess 88 for holding a packing material 28. A second completion plug 90 is shown in dotted lines in the second drilling fitting 80. The second completion plug 90 is removable from the second drilling fitting 80.

A second air lock housing 100 is mounted to the flange portion 82 of the second drilling fitting 80, preferably via bolts 102. The second air lock housing 100 also includes an interior portion or space 46 where various components and tools can be stored. A second manipulator 104 extends into the interior space 46 of the second air lock housing 100. Preferably the second manipulator 104 includes a manipulator arm that can rotate and/or extend at a wide sweep of angles from vertical within the second air lock housing 100. The second manipulator 104 is sealed against the gas pressure when the second air lock housing 100 is pressurized. The second airlock housing 100 also includes viewing ports 106 in the top and side of the second airlock housing 100. The viewing ports 106 permit an operator to visually observe the interior portion of the second air lock housing 100 and to see into the pipeline.

As shown in dotted lines in FIG. 2, the second completion plug 90, a second guide trough 108, a corner shield 110, a guide ball 42, and tapered split plugs 112 are stored inside the second air lock housing 100. These items are to moveable/installable within the second air lock housing 100 via the second manipulator 104.

A second removable packing gland 114 is engaged to and sealed with the exit gland 84. The second removable packing gland 114 includes a bore 116 connecting with the bore 86 of the exit gland 84. The second removable packing gland 114 also includes a recess 118 for holding packing material 28.

Referring now to FIG. 3, a second rod driver 124 is positioned near the second drilling fitting 80 and the second air lock housing 100. The second driving mechanism 124 feeds the fiber optic cable or conduit 8 into the pressurized gas pipeline 10 via the second removable packing gland 114. Preferably, the second driving mechanism 124 is a commercial tractor feeder. A guide duct 120 is advantageously located on an end of the second removable packing gland 114 to aid in guiding fiber optic conduit 8 through the second removable packing gland 114. Both rod drivers can push or pull the rod, fiber optic cable or conduit as required.

Referring back to FIG. 2, the second guide trough 108 is shown in its deployed configuration, wherein the second guide trough 108 is positioned by attaching to pipeline 10 or second drilling fitting 80 via studs 92 or another suitable mechanism. The second guide trough 108 aids in the removing and installing the duct rod 70 and fiber optic cable or conduit 8 into the pressurized gas pipeline 10. A cross-sectional view of the second guide trough 108 is shown in FIG. 4. The second guide through 108 is preferably coated with a low friction polymer coating such as TEFLON. As shown in FIG. 2, a second corner shield 110 is also shown in the deployed state. The second corner shield 110 helps prevent the duct rod 70 and fiber optic cable or conduit 8 from getting stuck or being abraded or cut during installation. Preferably, the second corner shield 110 is also coated with a low friction polymer such as TEFLON. Teflon coating the guide trough and corner shields reduces drag when installing cable, conduit or rod.

The guide troughs support the cable, conduit or rod to prevent kinks at the infeed end. They centralize and guide the cable, conduit or rod on the outfeed end. The corner shields protect the cable, conduit, or rod from abrasion and gouging caused by the rough machined edges of the drilled holes.

With reference to FIGS. 2 and 3, showing the system installed, in an overview of the method of introducing the fiber optic conduit 8 into the pressurized gas pipeline 10, generally the duct rod 70 is initially introduced into the pressurized gas pipeline 10 via an entry port in the first access or drilling fitting 18. The entry port preferably extends through the gland 22 and the first removable packing gland 50. However, the entry port can also include just the entry gland 22.

Figure 16:
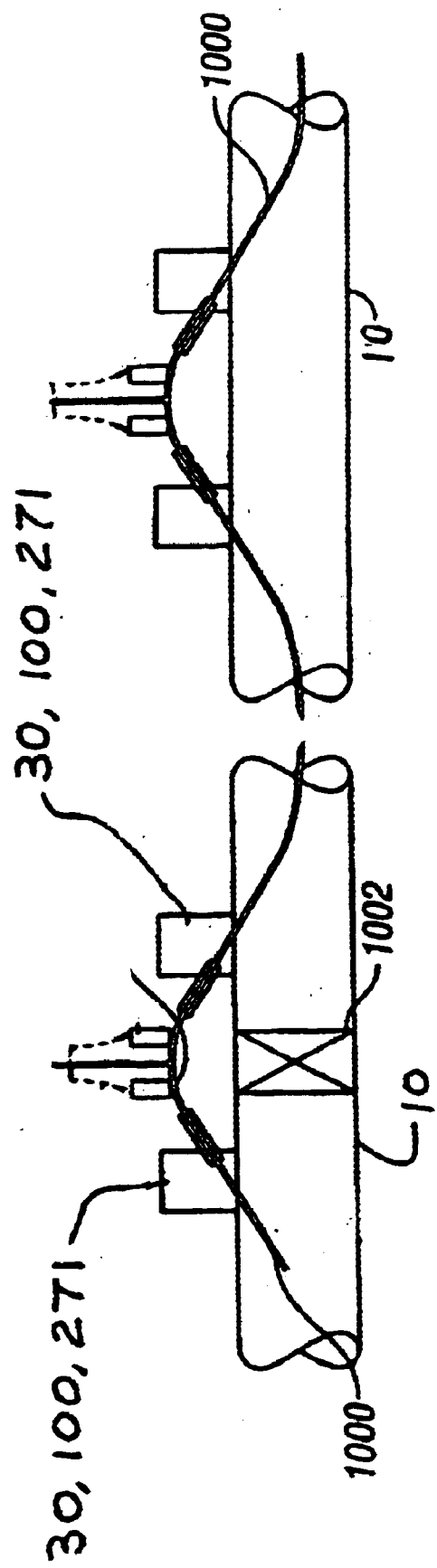
FIG. 16 is a schematic diagram of a system and method for installing a gas pipe inner duct within a pipeline.

After the corner shields and troughs (if used) are deployed within the first air lock housing 30, the duct rod 70 is advanced through the pressurized gas pipeline 10. Corner shields and troughs are optionally also deployed and removed in the second air lock housing 100. The duct rod 70 then exits the pressurized gas pipeline 10 via an exit port in the second drilling fitting 80. The exit port preferably includes the exit gland 84 and the second removable packing gland 114. However, the exit port can include just the exit gland 84. A fiber optic cable or conduit 8 or a gas pipe inner duct 1000 (as shown in FIG. 16) is then attached to the end of the duct rod 70. The duct rod 70 and the fiber optic conduit 8 are then pulled back through and out of the pressurized gas pipeline 10. The duct rod is preferably rewound onto a spool for reuse at the next segment of pipeline. The conduit can be joined to the next adjacent segment of conduit or left open for customer connection once a fiber optic cable is installed within the conduit using conventional installation techniques. With conduit installed and sealed at both ends, cable can be installed at a later date when convenient.

Turning now in detail to the system and methods of the invention, the installation begins by attaching (e.g., welding) the first drilling fitting 18 to the pressurized gas pipeline 10. The first removable packing gland 50 is installed in the entry gland 22. The leading end of the duct rod 70 is then inserted into the first removable packing gland 50 and the entry gland 22 to aid in sealing off pressurized gas. A drilling machine designed for drilling operations under gas pressure, such as a Mueller C-136, E-5 or similar drilling machine, is attached, e.g., bolted and sealed onto the drilling fitting. The pressurized gas pipeline 10 is then drilled via a drilling or cutting machine 251 (shown installed in FIG. 6). This drilling is preferably done at right angle to the pipeline. The slug is removed from the pressurized gas pipeline 10 and the first drilling fitting 18 is sealed with the first completion plug 26. The first air lock housing 30 is then mounted to the first drilling fitting 18 via bolts 32. Use of drilling fittings and drilling machines on pressurized pipelines is well known. Other commonly known techniques for creating an opening into the pipeline may also be used.

Using the viewing ports 36, an operator then uses the first manipulator 34 to substantially equalized the pressure in the first air lock housing 30 with the pressurized gas pipeline 10. The first completion plug 26 is removed and stored within the first air lock housing 30 via the manipulator 34. Next, the first guide trough 38 is deployed using the first manipulator 34. The first guide trough 38 is mounted to the studs 19. The end of the duct rod 70 is slowly fed into the fitting 18. The guide ball 42 is attached on the end of the duct rod 70 via the first manipulator 34. The guide ball 42 and the duct rod 70 are then pushed down the first guide trough 38 and through the pressurized gas pipeline 10. The first driving mechanism 60 provides the force needed to push the duct rod 70 and guide ball 42 along the pressurized gas pipeline 10. A dry lubricant may be added to the exterior of the duct rod 70 before it enters gland 50. Gas leakage is minimized by the glands and seals.

The second air lock housing 100 is installed in a similar manner as described above for the first air lock housing 30. The second drilling fitting 80 is attached to the pressurized gas pipeline 10. The second removable packing gland 114 is installed in the exit gland 84. A short piece of duct rod 70 is then inserted into the second removable packing gland 114 and secured to aid in sealing off the pressurized gas. The pressurized gas pipeline 10 is then drilled or otherwise opened up within the second drilling fitting 80. The slug is removed from the pressurized gas pipeline 10 and the second drilling fitting 80 is sealed with the second completion plug 90. The second air lock housing 100 is then mounted to the second drilling fitting 80 via bolts 102.

Using the viewing ports 106, an operator then uses the second manipulator 104 to substantially equalize the pressure in the second air lock housing 100 with the pressurized gas pipeline 10. The second completion plug 90 is removed and stored within the second air lock housing 100 via the manipulator 104. Next, the second guide trough 108 is deployed using the second manipulator 104. The second guide trough 108 is mounted on studs 92. The second air lock housing 100 can be installed on the pressurized gas pipeline 10 either before, after, or during the installation of the first air lock housing 30.

The shape of the second guide trough 108, as shown, for example in FIG. 4, leads the advancing guide ball 42 and duct-rod 70 into the second drilling fitting 80. The first guide trough 38 may also have this same profile. When the guide attachment 42 is part way up the second guide trough 108, the operator uses the second manipulator 104 to remove the guide attachment 42 and store the guide attachment 42 in the second air lock housing 100. The end of the duct rod 70 is then slowly advanced into the exit gland 84, if necessary with the help of the second manipulator arms, and pushes out the short piece of duct rod 70 that was sealing the second removable packing gland 114. Split plugs 44, 112 can be inserted from the inside of the first and second drilling fittings 18, 80 via the first and second manipulators 34, 104 to seal the system while the glands are arranged to pull the duct rod 70 and/or fiber optic conduit 8 through the pressurized gas pipeline 10.

With the duct rod 70 now pushed outside the exit gland 84, the fiber optic cable or conduit 8 or gas pipe inner duct 1000, is connected to the end of the duct rod 70, preferably via a cable grip 126 attached to the end of the duct rod 70. Once the duct rod 70 and the cable grip 126 are connected, the split plugs 112 are removed via the second manipulator 104. The first driving mechanism 60 then reverses direction and begins to pull the duct rod 70 and fiber optic conduit 8 back through the pressurized gas pipeline 10. At the same time, the second driving mechanism 124 feeds the fiber optic conduit 8 into the guide duct 120. The duct rod 70 is pulled at the same speed that the fiber optic conduit 8 is fed into the pressurized gas pipeline 10. A lubricant may be added to the exterior of the fiber optic conduit 8.

Alternatively, the duct rod at the entry can be pulled through to the end of its roll, and the fiber optic cable or conduit or gas pipe inner duct attached at the entry and pulled through the pipe from that point to the exit location. This approach allows the rod to be coiled at the exit location and be closely located to the next pipeline segment entry location. This facilitates multiple segment installations.

The first removable packing gland 50 is then sized to permit passage of the cable grip 126 such that the entry gland 22 (which will now be used as an exit gland since the duct rod 70 and fiber optic conduit 8 are being pulled in the opposing direction) can seal on the exterior of the cable grip 126 and fiber optic conduit 8. The duct rod 70 and fiber optic conduit 8 are then pulled out the first drilling fitting 18 into a final position. Once the duct rod 70 and fiber optic conduit 8 are in the final position, the tapered split plugs 44, 112 are placed into position using the first and second manipulators 34, 104. The first and second removable packing glands 50, 114 are then removed along with any packing material 28 and final split plug seals are installed.

The entry gland 22 and the exit gland seals 84 are finally secured and further sealed via a threaded nut 352 and service head adapter with shield nut 360 (shown in FIG. 15 and described below). The first completion plug 26 and the second completion plug 90 are retrieved and installed in the first and the second drilling fittings 18, 80 using the first and second manipulators 34, 104, respectively. The pressure is reduced in the first air lock housing 30 and second air lock housing 100 and the first and second air lock housings 30, 100 are removed from their respective flanges 20, 82.

In an alternative embodiment of the invention, shown in FIG. 5, the duct rod 70 is replaced with semi-rigid fiber optic or other conduit 8. A bull nose or bullet head 128 may be located on the end of the conduit 8 and allows the fiber optic conduit 8 to be pushed through the glands 22, 84 and pressurized gas pipeline 10 without the need for a separate duct rod 70 or for a rodding gland assembly 50, 118. As with the prior method, the drilling fittings 18, 80 and the first and second air lock housings 30, 100 would also be employed. The guide attachment 42, however, would not be needed. In this aspect of the invention, the fiber optic conduit 8 needs to be sufficiently rigid to permit the snaking of the fiber optic conduit 8 through the pressurized gas pipeline 10 for distances anticipated to be found between customer connection locations in urban environments. For example, the fiber optic conduit 8 can include one or more reinforcing layers wrapped around a central core conduit or, a duct rod can be inserted into the conduit. Alternatively, the fiber optic conduit 8 can be made of a composite polymer that has sufficient rigidity such that the fiber optic conduit 8 can be snaked through the pressurized gas pipeline 10. Pressurizing the conduit with compressed gas is another option for increasing the conduit rigidity.

Figure 6:
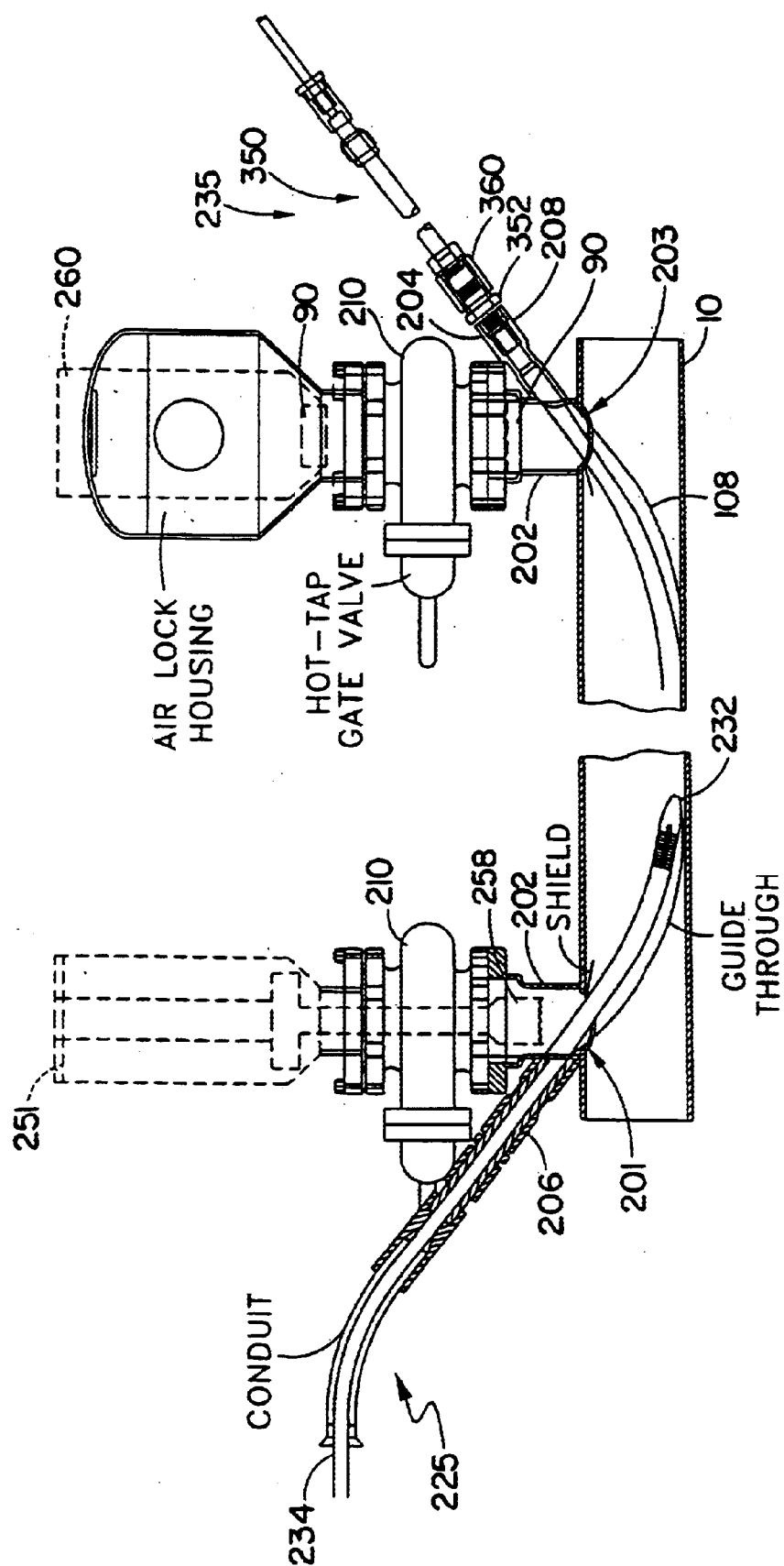
FIG. 6 is a schematic view of an another alternative system and method for installing conduit directly.

Referring now to FIG. 6, in an alternative system and method, standard "hot-tap" drilling fittings or line stopper fittings 202 are modified with a side arm 204 containing packing glands 208 at their outer ends. The fittings 202 are located in position on the gas pipeline 10 and welded in place. In plastic pipe, the plastic access fitting is fused to the pipe using conventional techniques such as electrofusion or heat fusion. A gate valve 210 and drilling machine 251 are attached to the drilling fitting 202. The valve 210 is opened. The drilling machine 251 extends a cutter 253 through the open valve and cuts a hole in the pipeline, within the drilling fitting 202. The cutter 253 is withdrawn back out through the open valve, and the valve is then closed. The drilling machine 251 is then removed (e.g., unbolted) leaving the gate valve in place. The air lock housing 30 is attached to the gate valve and the valve opened, giving access to the pipe through the air lock housing 30.

After the fiber optic cable or conduit installation is complete, the gate valve is closed, the air lock housing removed and a completion or stopping machine 260, such as a Mueller H-17235, E-5 or equivalent, is attached and sealed onto the drilling fitting, preferably via bolts. The completion machine 260 holds the completion plug 26 or 90. The valve is opened and the completion plug 26 or 90 is installed into the upright neck of the drilling fitting and tightened using the completion machine 260. The completion machine 260 and gate valve are removed and a blind flange or threaded cap is installed over the access fitting.

Figure 7:
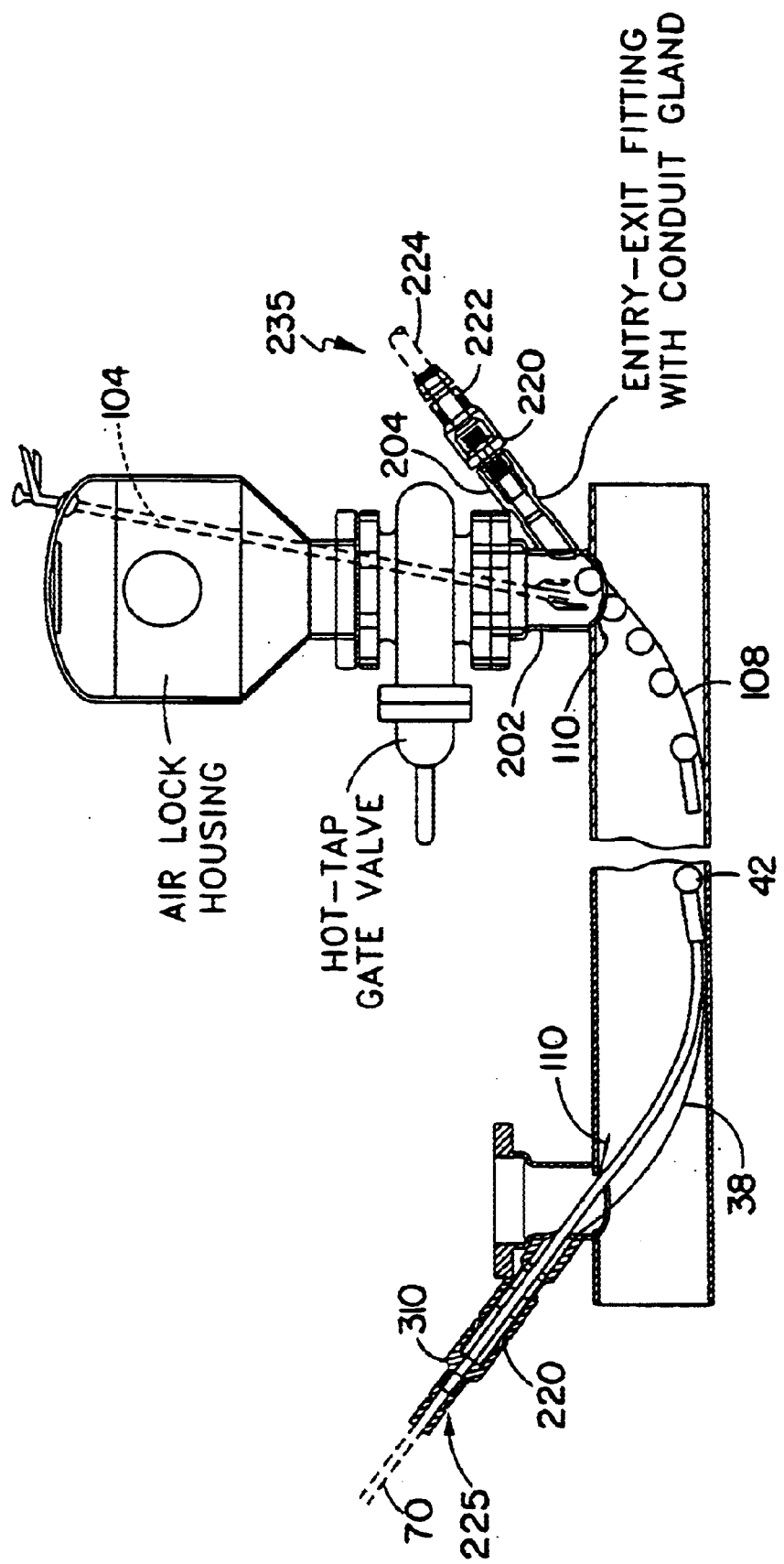
FIG. 7 is a schematic view of another method and system using a guide rod to pull cable or conduit back through a pipeline.

Referring to FIG. 7, when duct rodding is used, the following steps are preferably performed (although each step is not necessarily essential):

1. Before drilling the hole in the pipeline, conduit gland nut 222 or 352 and a rodding adapter gland nut 222 are attached to the entry/exit fitting 204 on the drilling fitting 202. On the infeed end 225, the rod 70 is inserted through the glands, and the rod guide attachment 42 is attached to the rod 70. The rod attachment is retracted into the recess at the inner end of the entry/exit fitting if its size detrimentally blocks the pipe entry hole 203. On the outfeed end 235, a short length of rod 224 is inserted into the rodding adapter 222 to act as a temporary plug.

2. Holes are cut in the pipeline. The air lock housings are attached as explained above.

3. Using the manipulator 34, 104, the guide troughs 38, 108 and corner shields 110 are installed from inside the air lock housings.

4. The rod 70 is pushed until the guide attachment 42 is at the top of the trough 108 at the outlet end 235. Alternatively, if no guide trough is used, the manipulator arms can be used to grasp the guide rod and maneuver it into the exit gland. Using the manipulator 104, the guide ball is removed and the rod is guided into the entry/exit fitting 204. Alternatively, the duct rod 70 is attached to the short piece of duct rod that was pre-installed in the exit gland. Once attached, the pre-installed rod piece 224 can be used to pull the duct rod 70 through the exit. In some applications, the duct rod or conduit may be snaked or driven through by hand, especially on shorter runs.

5. The rod is pushed through the glands, pushing out the plug 224.

6. By attaching a fiber optic or other type cable or a conduit, or inner duct, to either end of the rod, installation can proceed with forward or backward direction by pushing and/or puling the duct rod.

7. Split rubber plugs can be installed in the recesses at the inner ends of the entry/exit fittings using the manipulator to control leaking until the proper seal packing is installed in the glands.

8. Completion plugs area installed. The air lock housings and valves are removed, as explained above.

Figure 8:
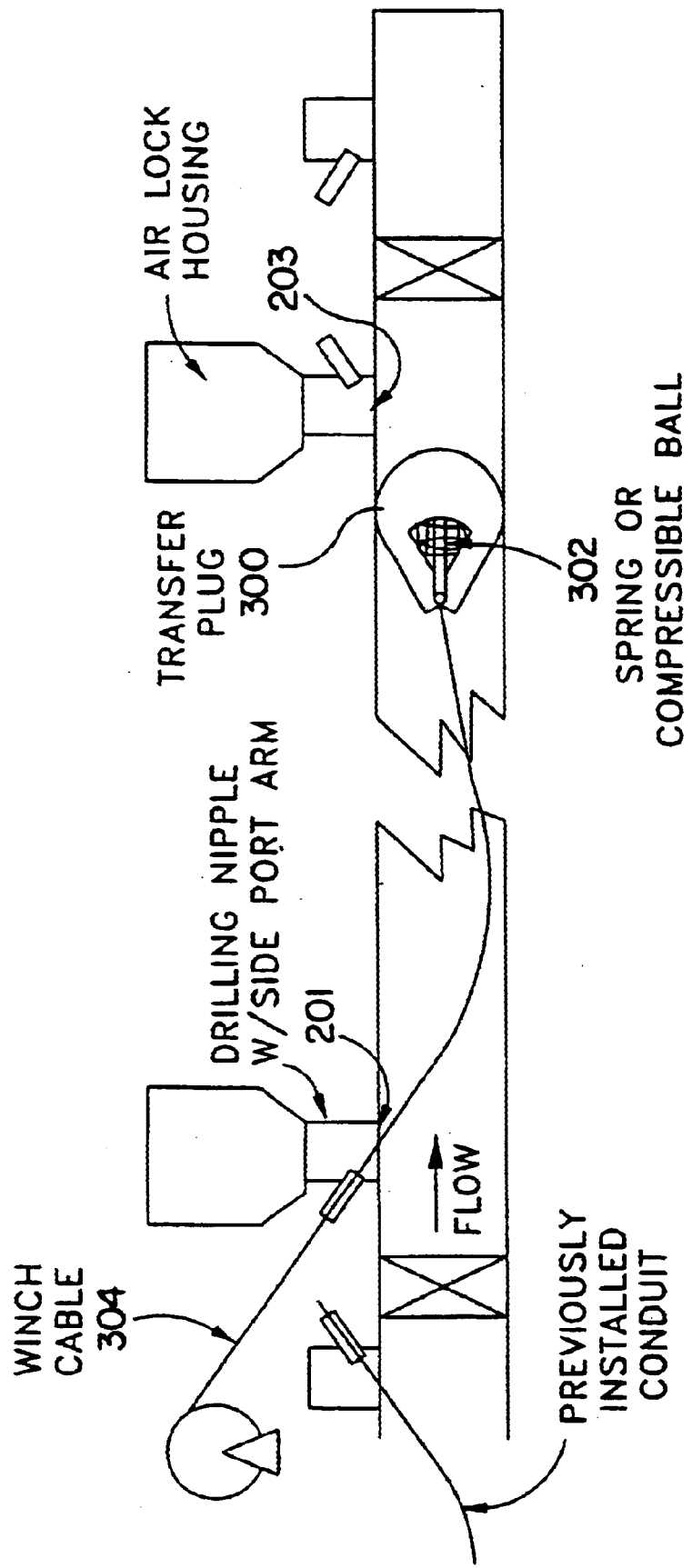
FIG. 8 is a schematic diagram of a transfer plug embodiment.

In place of the driving apparatus 60 and 124, in an alternative design shown in FIG. 8, a transfer plug 300 is installed into and removed from the pipeline via the air lock housings. The transfer plug 300 has a spring-like frame 302 which causes it to pop open after it is pushed through the entrance hole 201 cut into the pipeline. Alternatively, the transfer plug can be constructed with a solid, compressible core with a "memory" shape similar to the pipeline cross section. Preferably, the parachute has a diameter just slightly less than the pipeline diameter. A draw cable, rope, or wire 304 is attached to the transfer plug 300. The gas flowing through the pipe carries or blows the parachute 300 from the first drilling fitting to the second drilling fitting, where it is extracted through the exit hole 203, using the manipulator. The draw cable 304 is separated from the transfer plug and is pulled through the exit glands using an extractor hook on the end of a piece of duct rod 70. The back end of the draw wire 304 is attached to a cable or conduit. By pulling on the draw wire 304, the cable or conduit is pulled through the pipeline. Hence no duct rod is needed to route the conduit through the pipeline in this embodiment. In certain applications, compressed gas, such as nitrogen or air, may be used to blow the transfer plug 300 through the pipeline, instead of the gas. In routing or passing conduit through the pipeline, the conduit may be stiffened, by filling it with compressed gas, or by placing a stiffening element or material in the conduit. The stiffened conduit is easier to route.

Figure 13:
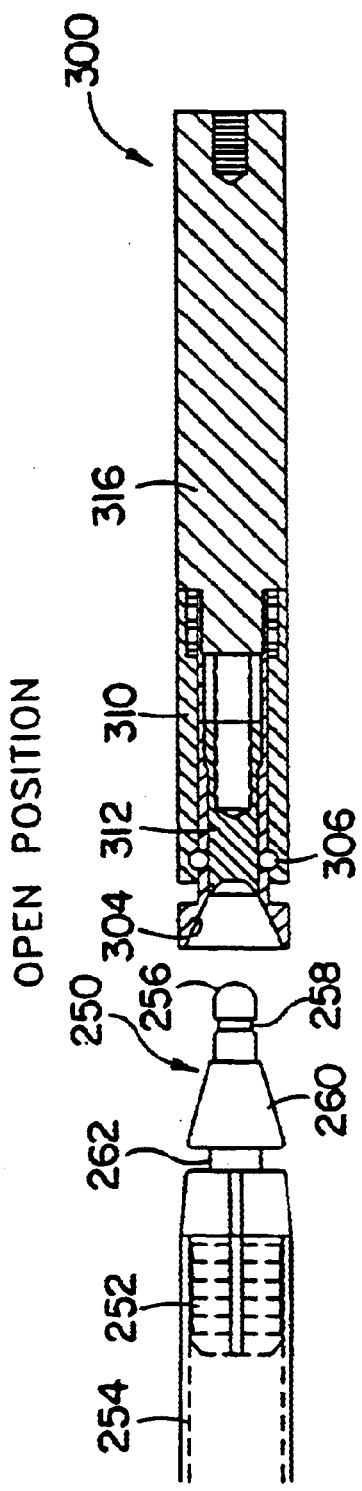
FIG. 13 is a section view of an end coupler aligned for engagement with the conduit end shown in FIGS. 9–12.

FIGS. 9–12 show an alternative design having an end plug 250 having grip rings 252 which secure it into the open end of a conduit 254. The end plug 250 preferably also has a spherical end nose 256, a coupler groove 258, a conical guide collar 260, and a neck 262, as shown in FIG. 13. A manipulator 270 on a fitting 271 attached to the pipeline has a hand 272 adapted to close around the neck 262. The hand 272 is supported on an armature 274 attached to the lower end of the manipulator 270 at a pivot joint 276. A linkage 278 on the armature 274 extends up through or near the armature 274, so that the hand 272 can be pivoted up at an angle, as shown in FIG. 12, by controlling the manipulator handles, outside of the air lock.

Figure 14:
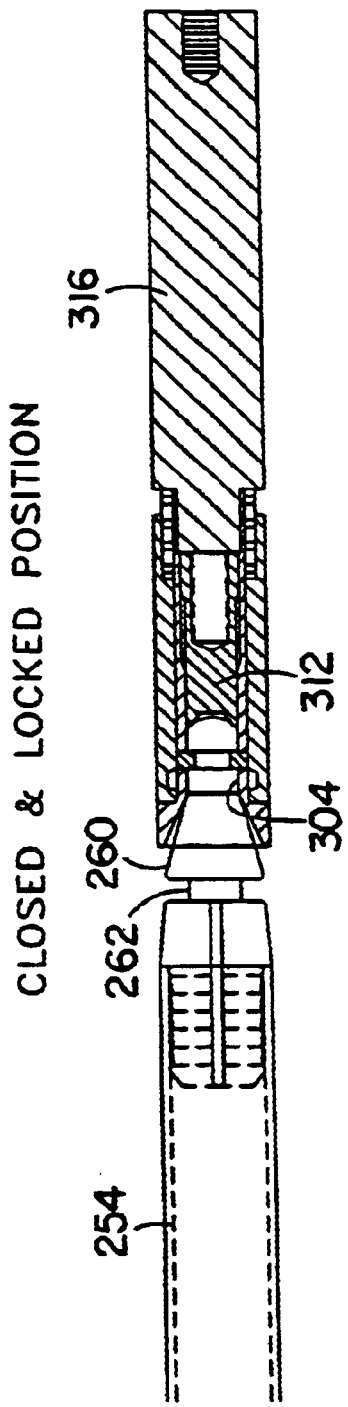
FIG. 14 is a section view of the end coupler of an extraction tool and conduit end of FIG. 13 coupled together.

Referring now also to FIGS. 13 and 14, a coupler 300 is positioned into a neck 302 of the fitting 271. The coupler has a receptacle 304 adapted to couple onto the end plug 250. The receptacle has ball bearings 306 engaging a groove in the receptable. The receptacle has a conical guide 308 adapted to cooperate with the guide collar 260, to guide the groove 258 into engagement with the ball bearings 306. The receptacle 304 is slidably positioned within a collar 310. An insert 312 within the receptacle is biased forward by a spring 313. A further description of the coupler 300 is provided below with reference to FIG. 41.

In use, the end plug 250 is maneuvered into position under the manipulator 270. The neck 262 is grabbed by the hand 272, as shown in FIG. 10. Using the linkage 278, the end plug 250 and attached conduit is tilted up into alignment with the coupler 300 in the neck 302. The collar 310 and receptacle 304 is pushed into engagement with the end plug 250. The ball bearings 306 move into the groove as the insert 312 moves back against the spring force. The end plug 250 and attached conduit can then be pulled out of the neck 302 by pulling on the extractor segment.

Referring to FIGS. 6 and 9–15, if conduit is to be installed directly, the following steps are preferably performed (although each step is not necessarily essential):

1. Before drilling the hole in the pipeline, the conduit gland nut 220 is attached to the entry/exit fitting. The conduit nose fitting 250 is installed on the end of the conduit 254 and pushed into the conduit gland to seal it. A coupler 300, as shown in FIGS. 9 and 13, is inserted into the exit port gland 204 and gland nut 220, shown in FIG. 6.

2. The valve is attached, the hole is drilled in the pipeline, and the air lock housing is attached as explained above.

3. Using the manipulator 270, the corner shields 400 are installed into the pipeline from inside the air lock housing, as shown in FIG. 19.

4. The conduit 254 is pushed through until the nose fitting 250 is reachable by manipulator arm 270 at the exit end 235. The manipulator 270 is used to attach the nose fitting 250 to the coupler 300. FIG. 9 shows detailed examples of the manipulator, nose fitting and coupler fittings and how they function as a system.

5. The coupler 300 is used to pull the conduit 254 through the exit gland 204 and gland nut 220

6. A completion plug is installed. The air lock housing and valves are removed as explained above.

7. The conduit 234 is now sealed to the pipeline 10 using a modified service head adapter with shield nut 360, but the interior of the conduit is still open. After the cable is installed in the conduit, it is preferably sealed to the conduit, either at the entry/exit fitting or at a remote end of the conduit. An assembly of appropriate glands will provide the seal in either case.

The guide troughs, guide ball, and corner shields may be omitted or replaced with functional equivalents.

Figure 15:
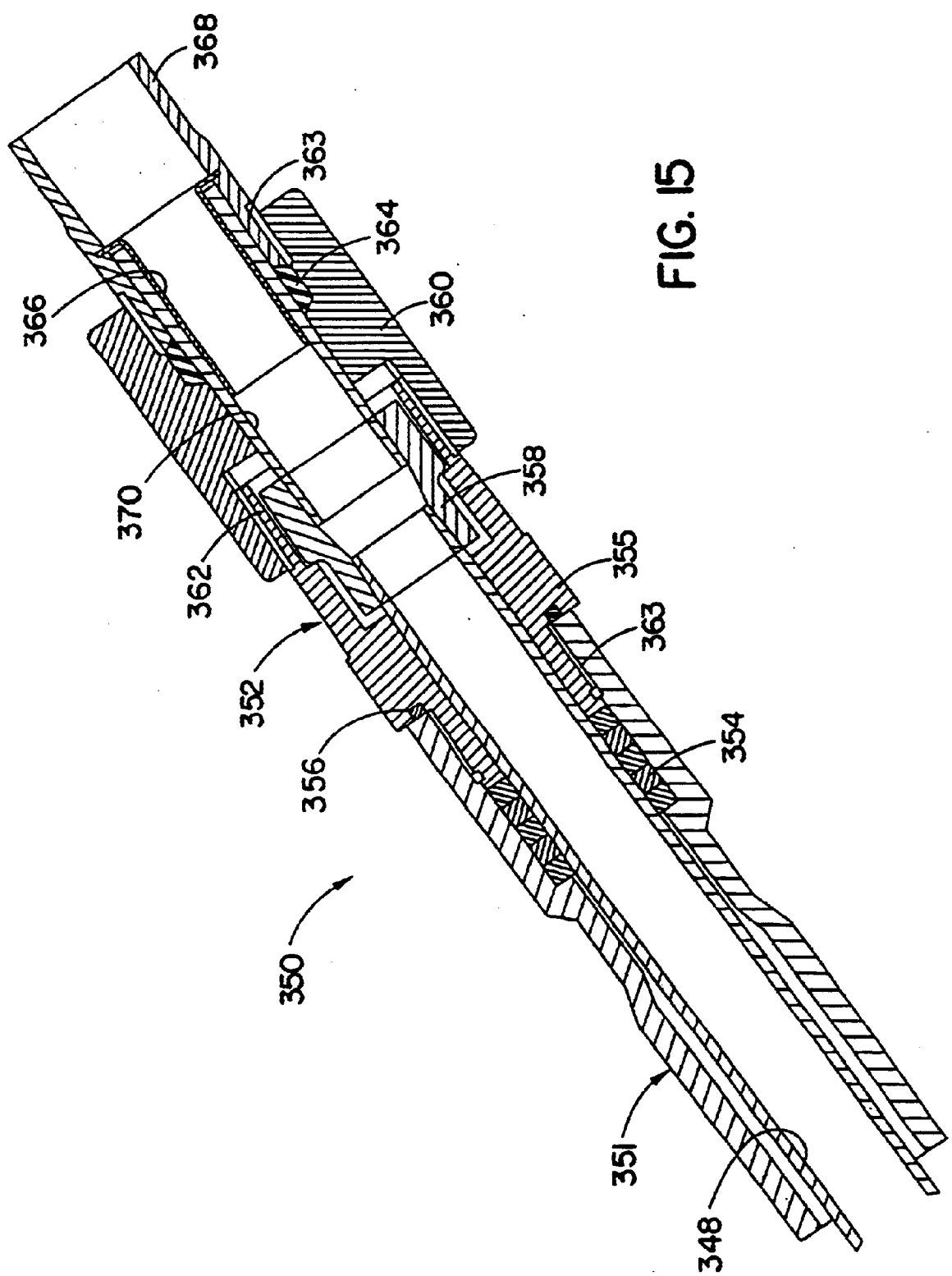
FIG. 15 is a section view of a sealing assembly for sealing a conduit after it is pulled or routed through a pipeline.

Turning to FIG. 15, a conduit, inner duct 1000 or other lumen 348 is sealed within a side arm 350 of a pipeline fitting, to prevent escape of pressurized gas. As shown in FIG. 15, a gland nut 352 is threaded into the side arm 350 via machine threads 363. An O-ring 356 at a shoulder 355 on the gland nut 352, and a packing assembly 354 within the side arm 350, provide a pressure tight seal between the gland nut 352 and the side arm 350. The packing assembly 354 also seals against the outside diameter of the conduit 348. The packing assembly includes a stack up of washers, packings, and split opposite packings.

A shield nut 360 is attached to the gland nut 352 via pipe threads 362. A fusion socket reducer 358 surrounds the outside diameter of the conduit 348, within the gland nut 352 and shield nut 360. A service head adapter 368 is threaded into the outer end of the shield nut 360, and is sealed against the shield nut 360 by an annular rubber seal 364. The service head adapter is a gas pipeline industry fitting used to seal plastic to metal. A pipe section 370 extends from the pipe section 368, through the shield nut 360 and into the fusion socket reducer 358. A pipe section stiffener 366 is provided within the pipe section 370.

With the design shown in FIG. 15, a pressure tight seal is formed around the conduit 348, without constricting the internal diameter or lumen of the conduit 348. This allows for sufficient installation of fiber cable into the conduit using compressed air.

The present systems and methods while especially useful with natural gas pipelines, may also be used with other types of pressurized pipelines, including pipelines carrying liquids, with appropriate modifications of the seals and glands.

Multiple, interchangeable packing glands allow use of the same entry/exit fitting with many sizes of cable, conduit or rod.

Multiple layers of split packing materials allow changing seals with the cable, conduit, or rod in place.

The duct rod or conduit (with or without stiffening devices) acts as a translating member, i.e., an element that is moved through the pipeline.

Nominal gas leakage may of course occur in using the present system and methods, without affecting the advantageous results. The description herein of sealing, seals, pressure tightness, etc. and steps performed without allowing gas to escape, of course contemplate and include situations where nominal leakage occurs.

If suitably strong manipulators are used, the gate valve is not needed and the air lock housing can be mounted directly to the drilling fitting, as shown in FIGS. 2 and 3. After equalizing pressure, the completion plug could be removed with the manipulator and stored inside the air lock housing.

The attachment of components described above are made pressure-tight, to prevent gas from escaping form the pipeline, using known seals, components and methods, except as specified.

The systems and methods described above may also be used to upgrade existing gas pipe through insertion of new gas pipe inside of the old pipe. The newly installed gas pipe (gas pipe inner duct) may also be used to house a telecommunications conduit (fiber innerduct) and fiber cable. The process and fittings can be used to install 10–50 mm diameter or preferably larger gas pipe innerduct into larger diameter cast iron, steel or plastic pipelines. The primary advantages of using this process to upgrade existing gas pipelines are:

The existing pipeline does not have to be de-pressurized or removed from service; and If communication lines (e.g., fiber optic lines) are concurrently installed, the construction cost can be shared between the gas and telecommunications companies.

If fiber inner duct is installed, exit locations using appropriately sized fittings can be installed at periodic locations prior to pressuring the gas innerduct and bringing it into service. In addition, gas service connections can also be attached at the gas innerduct entry/exit locations from the existing pipe prior to pressurizing the new gas pipe.

Continuous service to the customer is maintained throughout the entire live insertion process by maintaining pressurized gas in the annular space between the outside diameter of the inserted gas innerduct and the inside diameter of the existing pipeline. Since gas service is unaffected, customers may be systematically transferred to the newly installed gas pipe inner duct at a later time. This reduces the labor and equipment resources needed, as well as utility customer inconvenience.

Figure 17:
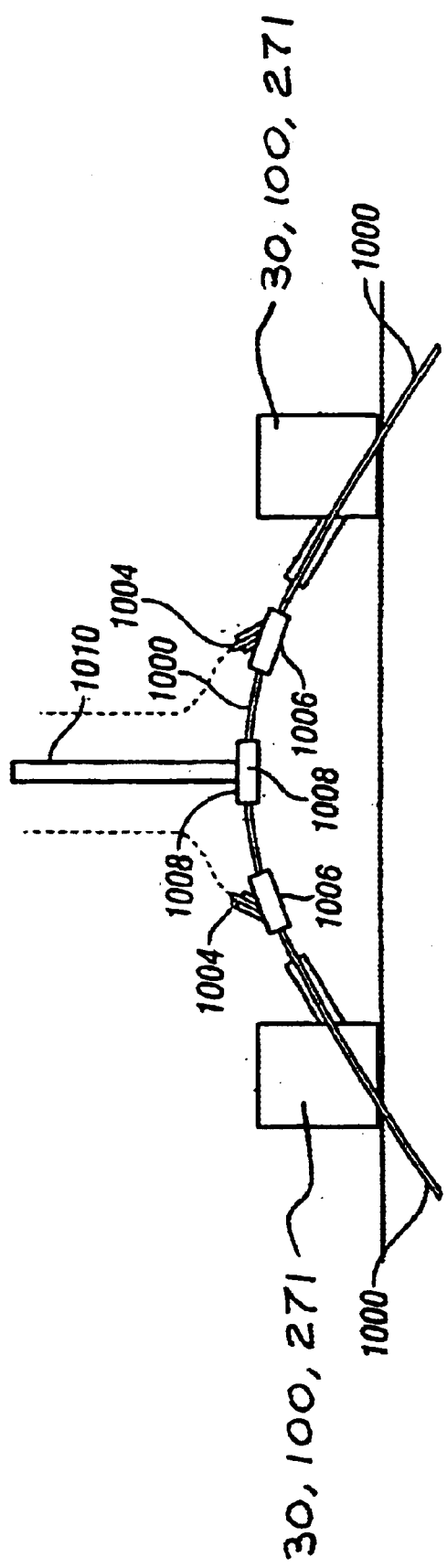
FIG. 17 is an enlarged schematic diagram of the system and method shown in FIG. 16.

FIGS. 16 and 17 show installation of a new pipeline within an existing (and typically buried) pipeline. The gas pipe inner duct 1000, preferably plastic or polyethylene, is routed through fittings in the same ways as a conduit or cable, as described above. The fittings 30, 100 or 271 may be on opposite sides of a valve 1002 in the pipeline 10, or they may be spaced as far apart as translating member movement (e.g., duct rodding) allows for. Mid-pipe connection techniques, as described in U.S. patent application Ser. No. 10/158,414, filed May 29, 2002, incorporated by reference, may also be used to route gas pipe inner duct through a pipeline.

Referring to FIGS. 16 and 17, the gas pipe inner duct 1000 is routed out of the pipeline 10 at a first fitting 30, 100, 271, or a similar equivalent fitting, using the methods as described above. If fiber optic conduit 1004 is included within the gas pipe inner duct 1000, the conduit 1004 is branched out at fiber optic conduit fittings 1006. The conduit 1004 can then run into buildings, switches, etc., or back into the gas pipe inner duct 1000, by passing the gas service T 1008. The gas service T 1008 connects a secondary or building service pipeline 1010 into the gas pipe inner duct 1000.

The gas pipe inner duct 1000 will typically be standard polyethylene pipe certified for use in natural gas systems. The gas pipe conduit is installed via any of the methods described above (e.g., direct insertion; by duct rods; using mid-pipe coupling techniques). In addition to the fitting shown in FIG. 15, there are alternative seals that may be less expensive and/or operationally preferred by individual utilities. One method is to connect the service head adapter 368 directly to the conduit 348 at the fitting 350

One advantage of this system is that gas pipe inner duct 1000 service T's and/or fiber optic conduit and access fittings can be installed easily, prior to pressurization of the gas pipe inner duct 1000, at the point the gas pipe inner duct exits the pipeline being upgraded. As this can be accomplished before pressurization of the gas pipe inner duct 1000, the processes for installing the fittings and inserting the fiber conduit can be conducted quickly. This system may be used to provide a pipeline upgrade, or a fiber optic line installation, or both. After all of the connections are made, as shown in FIGS. 16 and 17, the gas pipe inner duct 1000 may be pressurized with natural gas, and the existing obsolete pipeline around it can be depressurized and removed from service.

Thus novel methods, components and systems have been described. Various changes and substitutions may of course be made all within the spirit and scope of the invention. The invention, therefore, should not be limited, except to the following claims and their equivalents.

What is claimed is:

1. A method of installing a gas pipe inner duct into a pressurized gas pipeline comprising the steps of:
   attaching a first access fitting to the pressurized gas pipeline at a first location;
   attaching a second access fitting to the pressurized gas pipeline at a second location;
   inserting a translating member attached to a pull back member into the pipeline through the first access fitting;
   sealing the pull back member directly or indirectly with the first access fitting, to avoid gas leakage at the first access fitting;
   routing the translating member and pull back member through the pipeline from the first access fitting to the second access fitting;
   attaching a gas pipe inner duct directly or indirectly to the pull back member;
   pulling the pull back member along with the gas pipe inner duct from the second access fitting back to the first access fitting;
   extracting the pull back member and the gas pipe inner duct from the pipeline through the first access fitting; and
   sealing the pull back member and gas pipe inner duct at least indirectly with the first access fitting to avoid significant escape of gas at the first access fitting.

2. The method of claim 1 where the gas pipe inner duct is attached directly or indirectly to the pull back member within the pipeline, adjacent to the second access fitting.

3. The method of claim 1 further including the step of extracting the translating member out of the pipeline through the second access fitting, and attaching the pullback member to the gas pipe inner duct outside of the pipeline.

4. The method of claim 1 further including the steps of installing final gas-tight seals around the inner duct after the conduit is installed.

5. The method of claim 1 wherein the translating member comprises a duct rod.

6. A method of installing a new gas pipeline within an exisiting gas pipeline, comprising the steps of:
   attaching a first access fitting to the pressurized gas pipeline at a first location;
   attaching a second access fitting to the pressurized gas pipeline at a second location;
   inserting a gas pipe inner duct into the pipeline through the first access fitting;
   sealing the gas pipe inner duct directly or indirectly to the first access fitting;
   routing the gas pipe inner duct through the pipeline;
   extracting the gas pipe inner duct from the pipeline at the second access fitting;
   sealing the gas pipe inner duct to the second access fitting; and
   transporting compressed gas through the gas pipe inner duct, which serves as the new gas pipeline, in place of the existing gas pipeline.

7. The method of claim 6 further including the step of sealing the inner duct to the pipeline to effect a gas-tight seal on both the first and second access fittings.

8. The method of claim 6 with the gas pipe inner duct also containing a telecommunications conduit or cable.

9. The method of claim 6 wherein the gas pipe inner duct is sealed directly to the first or second access fittings.

10. A method of installing a gas pipe inner duct into a pressurized gas pipeline comprising the steps of:
    attaching a first access fitting to the pressurized gas pipeline at a first location;
    attaching a second access fitting to the pressurized gas pipeline at a second location;
    inserting a translating member into the pipeline through the first access fitting;
    sealing the translating member with the first access fitting, to avoid gas leakage at the first access fitting;
    routing the translating member through the pipeline from the first access fitting to the second access fitting;
    attaching a gas pipe inner duct to the translating member;
    pulling the translating member along with the gas pipe inner duct back from the second access fitting back to the first access fitting;
    extracting the translating member and the gas pipe inner duct from the pipeline through the first access fitting; and
    sealing the gas pipe inner duct with the first access fitting.

* * * * *